UNITED STATES PATENT OFFICE 2,570,083

PRODUCTION OF THIOPHENE FROM DIOLEFIN AND HYDROGEN SULFIDE

Edward F. Wadley, Baytown, Tex., assignor, by mesne assignments, to Standard Oil Development Company, Elizabeth, N. J., a corporation of Delaware No Drawing. Application April 14, 1947, Serial No. 741,238

5 Claims. (Cl. 260—332.8)

The present invention is directed to a method for producing thiophene. More particularly, the invention is concerned with a method for producing thiophene under non-catalytic conditions.

Thiophene has been found to be a very valuable chemical for altering the elasticity, brittleness, hardness, and other properties of plastics, for changing the coloring of dye stuffs, and imparting certain physiological effects to pharmaceuticals. Thiophene compounds and thiophene itself, therefore, are much in demand in view of their versatility in the uses mentioned above and in organic synthesis. Heretofore, the commercial availability of thiophene has been such that it has been more or less a rare chemical in view of the price that the cost of producing this material has made necessary.

It is an object of the present invention to provide a process for producing thiophene from butadiene under non-catalytic conditions.

Another object of the invention is to provide a method for reacting diolefins such as butadiene-1,3 to produce thiophene under non-catalytic conditions.

In accordance with the present invention, large quantities of thiophene are made available by reacting a diolefin such as butadiene-1,3 with hydrogen sulfide at temperatures ranging from 500° to 650° C. Under these temperatures and substantially atmospheric pressure, it is possible to produce high yields of thiophene to the exclusion of large quantities of by-products.

It was indeed surprising to find that butadiene-1,3 and hydrogen sulfide reacted under non-catalytic conditions to produce thiophene since prior investigators have reported that thiophene was formed when butadiene admixed with hydrogen sulfide was passed over iron pyrites at a temperature in the range of 500° to 600° C. The early investigators found that, while thiophene was produced in substantial amounts, the product contained, besides thiophene, aromatic hydrocarbons, carbon disulfide, and unidentified substances in appreciable quantities. Moreover, later investigators reported that mixtures of butadiene and sulfur could not be reacted to produce thiophene in view of the fact that the reaction rate of the butadiene was so rapid that coking took place in the heating circuits of the reactor.

I have found, however, that butadiene and H₂S in substantially equimolar mixture may be heated under non-catalytic conditions to a temperature in the range between 500° and 650° C. to produce a product from which a fraction containing substantial quantities of thiophene and benzene to the exclusion of other reaction products with the exception of a small amount of carbon disulfide may be segregated. In accordance with the present invention, an equimolar mixture of butadiene and H₂S was passed through a reactor, which was constructed of a high purity silica, at a temperature between 588° and 593° C. The products issuing from the reactor were cooled, condensed, recovered and distilled. Analysis of the product showed it to contain a substantial quantity of thiophene.

To compare the practice of the present invention with the prior art, another run was made in which pilled iron pyrites catalyst was added to the same reactor and the procedure repeated. The recovered products were analyzed and found to contain smaller quantities of thiophene than the product obtained in the process of the present invention. The results of these runs are shown in the following table in which the prior art practice is compared with the process of the present invention:

|  | Prior Art Procedure | Present Invention |
|---|---|---|
| Catalyst used | Iron Pyrites | None |
| Reaction Temperature, °C | 588–593 | 588–593 |
| Yield of Product, Wt. per cent based on Butadiene-1,3 | 32.6 | 39.6 |
| Product Analysis: |  |  |
| Volume per cent boiling between 46° and 91° C | 20 | 24 |
| Weight per cent thiophene | 8.5 | 11.1 |
| Analysis of 46° to 91° C. fraction: |  |  |
| Weight per cent thiophene | 42.6 | 46.3 |
| Benzene | 35.2 | 52.7 |
| Toluene | 8.5 |  |
| Carbon disulfide | 2.1 | 1.0 |
| Unknown | 11.6 |  |

It will be seen from the data reported in the foregoing runs that the practice of the present invention is favored further by the formation of valuable aromatic hydrocarbons such as benzene. It will be further apparent that the prior art practice produced a product in lower yield which requires expensive purification procedures to recover the thiophene.

When practicing the present invention, the amount of butadiene in the feed mixture may vary between 30 and 70 mole per cent while the amount of hydrogen sulfide will vary similarly. The temperature should be carefully controlled within the range of 500° to 650° C. Temperatures below 500° C. should be avoided since thiophene yields are substantially decreased in the lower temperatures and the total product yield is likewise decreased. The dimer of butadiene is stable at the lower temperature below 500° C. and, therefore, as formation of the dimer is to be avoided, the temperature to be employed should be maintained above 500° C.

Although atmospheric pressures may be employed with good results in the present invention, higher pressures may be used when necessary. Generally pressures in the range between about 15 to 150 pounds per square inch will be satisfactory.

The procedural steps employed will generally include the formation of a mixture of butadiene and hydrogen sulfide in optimum proportions and heating the mixture under non-catalytic conditions to a temperature in the range of 500° to 650 C. The effluent from the reactor is cooled and condensed to recover products boiling above about 25° C. The products boiling below about 25° C. will generally be in a vaporous and/or gaseous state and may be recovered and processed as such. Uncondensable material will generally include the greater portion of the unreacted hydrogen sulfide and it may be desirable to scrub the uncondensed product with an alkaline solution to remove the hydrogen sulfide or to recover it. The uncondensed portion may be fractionally distilled to recover unreacted butadiene or the uncondensed portion of the product may be recycled without treatment to the reactor.

Although substantially pure butadiene-1,3 is preferred as the feed stock, it is within the purview of this invention to employ mixtures of butadiene with butylenes, for example, as the feed stock. When it is desired to produce the higher homologs of thiophene, the higher boiling diolefins such as isoprene and pentadiene may be employed in lieu of butadiene.

Since the prior art process of conducting the operation under catalytic conditions in the presence of iron type catalyst such as pyrites is disadvantageous, the reactor employed in the present invention should be constructed of structural material which will not exert a catalytic effect. Therefore, the reactor should be composed of high purity silica, quartz, or other ceramic material, which will withstand the high temperatures, or of metals whose catalytic activity has been suppressed by suitable pretreatment. Thus, it may be possible to pretreat a ferrous alloy reactor with hydrogen sulfide in small quantities and poison its catalytic effect and then employ it as a reactor under substantially non-catalytic conditions in accordance with the present invention.

The nature and objects of the present invention having been fully described and illustrated, what I wish to claim as new and useful and to secure by Letters Patent is:

1. A process for producing a thiophene which includes the steps of heating a mixture of a conjugated diolefin selected from the group consisting of butadiene, isoprene, and pentadiene with hydrogen sulfide in a silica lined reaction chamber in the absence of added catalyst to a temperature in the range of 500° to 650° C.

2. A process for producing a thiophene which includes the steps of forming a mixture of a conjugated diolefin selected from the group consisting of butadiene, isoprene, and pentadiene and hydrogen sulfide, heating the mixture in a silica lined reaction chamber in the absence of added catalyst to a temperature in the range of 500° to 650° C. to form a product including a thiophene, and recovering the product.

3. A method for producing thiophene which includes the step of heating a mixture of butadiene-1,3 and hydrogen sulfide to a temperature in the range of 500° to 650° C. in a silica lined reaction chamber in the absence of added catalyst.

4. A method for producing thiophene which includes the steps of forming a mixture of butadiene-1,3 and hydrogen sulfide, heating the mixture to a temperature in the range of 500° to 650° C. in a silica lined reaction chamber in the absence of added catalyst to form a product including a substantial amount of thiophene, and recovering the product.

5. A method in accordance with claim 4 in which the mixture of butadiene-1,3 and hydrogen sulfide is in substantially equimolar ratio.

EDWARD F. WADLEY.

REFERENCES CITED

The following references are of record in the file of this patent:

UNITED STATES PATENTS

| Number | Name | Date |
|---|---|---|
| 1,907,274 | Wheeler | May 2, 1933 |
| 2,411,236 | Thacker | Nov. 19, 1946 |

FOREIGN PATENTS

| Number | Country | Date |
|---|---|---|
| 603,103 | Great Britain | June 9, 1948 |

OTHER REFERENCES

Moore and Greensfelder, J. Am. Chem. Soc., 69, 2008–2009 (1947) August.

Schneider, Ber. 70B, 429 (1937).